(12) United States Patent
Akiyama et al.

(10) Patent No.: US 10,250,479 B2
(45) Date of Patent: *Apr. 2, 2019

(54) DETECTING PATTERNS OF EVENTS IN INFORMATION SYSTEMS

(71) Applicant: INTERNATIONAL BUSINESS MACHINES CORPORATION, Armonk, NY (US)

(72) Inventors: Kazuhito Akiyama, Machida (JP); Yasutaka Nishimura, Yamato (JP); Tadashi Tsumura, Sagamihara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,126

(22) Filed: Mar. 27, 2017

(65) Prior Publication Data
US 2017/0201449 A1 Jul. 13, 2017

Related U.S. Application Data

(63) Continuation of application No. 14/209,256, filed on Mar. 13, 2014, now Pat. No. 9,660,893, which is a (Continued)

(30) Foreign Application Priority Data

Jun. 19, 2007 (JP) .................. 2007-161154

(51) Int. Cl.
*G06F 9/54* (2006.01)
*H04L 12/26* (2006.01)
(52) U.S. Cl.
CPC .............. *H04L 43/10* (2013.01); *G06F 9/542* (2013.01); *H04L 43/04* (2013.01); *H04L 43/06* (2013.01); *G06F 2209/544* (2013.01)

(58) Field of Classification Search
None
See application file for complete search history.

(56) References Cited

U.S. PATENT DOCUMENTS 5,692,156 A 11/1997 Bahls et al.
6,049,776 A 4/2000 Donnelly et al.
(Continued)

FOREIGN PATENT DOCUMENTS

JP 08331125 12/1996
JP 09265460 10/1997
(Continued)

OTHER PUBLICATIONS

NIWS Corp.; What is Autonomic Computing?; First edition, Softbank Publishing Inc.; Feb. 19, 2005.
(Continued)

*Primary Examiner* — Craig C Dorais
(74) *Attorney, Agent, or Firm* — Grasso PLLC

(57) ABSTRACT

There is provided a system having a plurality of information processing apparatuses, each of which includes a storage device where at least one piece of pattern data indicating an occurrence pattern of events to be detected in the information processing apparatus is stored, a generation section that specifies a collection of events to be detected in the occurrence pattern based on the pattern data read from the storage device and generates necessary event data indicating the specified collection of events, a selection section that selects an event included in the necessary event data from events which have occurred in the information processing apparatus and events transferred from another information processing apparatus, and a detection section that detects if the selected event matches with the occurrence pattern indicated by the pattern data, and outputs a detection result.

19 Claims, 15 Drawing Sheets

Related U.S. Application Data continuation of application No. 12/133,516, filed on Jun. 5, 2008, now Pat. No. 8,707,335.

(56) References Cited

U.S. PATENT DOCUMENTS

| | | |
|---|---|---|
| 6,189,141 B1 | 2/2001 | Benitez et al. |
| 7,840,575 B2 | 11/2010 | Chandrasekaran |
| 7,992,053 B2 | 8/2011 | Akiyama et al. |
| 2001/0049713 A1 | 12/2001 | Arnold et al. |
| 2004/0193923 A1 | 9/2004 | Hammond et al. |
| 2005/0073992 A1 | 4/2005 | Lee et al. |
| 2005/0078660 A1 | 4/2005 | Wood |
| 2005/0091167 A1 | 4/2005 | Moore et al. |
| 2005/0102312 A1 | 5/2005 | Ohya et al. |
| 2005/0166072 A1 | 7/2005 | Converse |
| 2005/0172162 A1 | 8/2005 | Takahashi et al. |
| 2006/0206882 A1 | 9/2006 | Illowsky et al. |
| 2006/0206900 A1 | 9/2006 | Ooyama et al. |
| 2007/0088914 A1 | 4/2007 | Soman et al. |
| 2007/0168743 A1 | 7/2007 | Ramamurthy et al. |
| 2007/0168789 A1 | 7/2007 | Udell |
| 2008/0320326 A1 | 12/2008 | Akiyama et al. |
| 2009/0113250 A1 | 4/2009 | Meijer et al. |
| 2009/0132203 A1 | 5/2009 | Shimada et al. |
| 2009/0172034 A1 | 7/2009 | Aoyama et al. |

FOREIGN PATENT DOCUMENTS

| | | |
|---|---|---|
| JP | 10269252 | 10/1998 |
| JP | 10334058 | 12/1998 |
| JP | 11224214 | 8/1999 |
| JP | 2000330912 | 11/2000 |
| JP | 2001101108 | 4/2001 |
| JP | 2003296129 | 10/2003 |
| JP | 2005222216 | 8/2005 |
| JP | 2005251207 | 9/2005 |
| JP | 2006209206 | 8/2006 |
| JP | 2006261804 | 9/2006 |

OTHER PUBLICATIONS

Biazetti; Realizing Compound Event Processing Using Active Correlation Technology; Jun. 16, 2009.

"An Architectural Blueprint for Automatic Computing", Autonomic Computing White Pages, G507-2065-00, IBM Corporation, Fourth Edition, Jun. 2006.

```
 1: <muws1:ManagementEvent muws1:ReportTime="2006-11-22T21:12:26+09:00"
 2: muws2:sequenceNumber="0">
 3:   <muws1:EventId>uuid:GEA1DB7A22B7BCEBD0C707E4F6F350AE47</muws1:EventId>
 4:   <muws1:SourceComponent>
 5:     <muws1:ResourceId>device://something_decided_by_WSDM_setResouceID</muws1:ResourceId>
 6:     <eac:ResourceType>IBM Printer 88008</eac:ResourceType>
 7:     <eac:ComponentIdentification eac:component="Copier function"
 8: eac:subComponent="Output"/>
 9:   </muws1:SourceComponent>
10:   <muws2:Situation>
11:     <muws2:SituationCategory>
12:       <muws2:ReportSituation/>
13:     </muws2:SituationCategory>
14:     <muws2:SituationTime>2006-11-22T21:12:26+09:00</muws2:SituationTime>
15:     <muws2:Priority>0</muws2:Priority>
16:     <muws2:Severity>0</muws2:Severity>
17:     <muws2:Message>PRNT0001W: no papers</muws2:Message>
18:     <muws2:SubstitutableMsg muws2:MsgId="PRNT0001"
19: musw2:msgIDType="http://printer.ibm.com/type8000"/>
20:     </muws2:SubstitutableMsg>
21:   </muws2:Situation>
22:   <eac:Destination> </eac:Destination>
23:   <eac:EventStored>true</eac:EventStored>
24:   <eac:ExtendedContent eac:name="printingCount">
25:     <eac:values>756</eac:values>
26:   </eac:ExtendedContent>
27: </muws1:ManagementEvent>
```

FIG. 3B

| EVENT ID | EVENT | | | SENDER ID | DELETED FLAG | RECEIVER ID |
| --- | --- | --- | --- | --- | --- | --- |
| | TIME | SOURCE | CONTENT | | | |
| ... | ... | ... | ... | ... | ... | ... |
| 1234 | 06:00 | 100E | PRIORITY 0 | 100D | — | — |
| ... | ... | ... | ... | ... | ... | ... |
| 2345 | 06:10 | 100E | — | — | ✓ | 100A |
| ... | ... | ... | ... | ... | ... | ... |
| 3456 | 07:10 | 100D | PRIORITY 1 | — | — | 100A |
| ... | ... | ... | ... | ... | ... | ... |

| DEVICE ID | REQUESTED EVENT DATA | NECESSARY EVENT DATA | DETECTABLE EVENT DATA |
|---|---|---|---|
| 100A | 1234, 2345, ... | — | — |
| 100D | 5678, 6789, ... | — | — |
| 100C | — | 1234, ... | 3456, ... |

FIG. 5

DETECTING PATTERNS OF EVENTS IN INFORMATION SYSTEMS

FIELD OF THE INVENTION

The present invention relates to a technique of detecting events which have occurred in an information system. Particularly, the present invention relates to a technique of detecting if events have occurred in a predetermined occurrence pattern.

BACKGROUND ART

A computer system not only may face a problem, such as an operational failure or a performance failure, but also may need to change the system setting when the setting does not match with the purpose of the computer system. The occurrence of such a problem or the need to change the setting is called "symptom". Detecting and attending to a symptom can ensure efficient and safe management of a computer system. Because recent computer systems are complex, however, it is not easy to detect and attend to a symptom when occurred therein. There has been proposed a technique of allowing a computer to detect and attend to a symptom occurred therein.

In autonomic computing, a system of detecting and attending to symptoms is called an autonomic manager, which includes analysis, plan and execution functions (see pp. 10-11 of the above article). To add a new function to the autonomic manager to be able to, for example, detect a new symptom, a knowledge base is used (see p. 12 of the above article). To adequately function the system, therefore, it is desirable to sufficiently collect information of events needed for analysis first, then permit the use of a sufficient processing capability to achieve a plan and execution thereof, and further to provide a sufficient storage area for storing the knowledge base.

Recent devices, such as cellular phones, PDAs (Personal Data Assistants) and home appliances, are equipped with various functions of a computer. However, those devices do not have a sufficient processing capability or a sufficient storage area, thus making it difficult to allow those devices to adequately operate an autonomic manager. It is also difficult to detect occurrence of a specific symptom from the operation of a device itself. Such a specific symptom may occur due to complex factors including a server which communicates with the device. Even with a sufficient processing capability, therefore, it may not be proper for each device to operate an autonomic manager.

Because such devices are becoming exceedingly popular recently, a server may not be able to intensively manage symptoms occurred in individual devices due to the insufficient processing capability of the server. Those devices often suffer an unstable communication state, so that the server may not adequately collect the statuses of the individual devices even if it tries. Further, a system which allows each device to request the server to detect and attend to a symptom takes a longer process time by the time needed for a communication process, as compared with a case where a device itself detects and attends to a symptom. This is likely to reduce the operability and convenience.

SUMMARY OF THE INVENTION

Accordingly, it is an object of the present invention to provide a system, an information processing apparatus, a method and a program which can solve the foregoing problems. The object is achieved by combinations of the features described in independent claims in the appended claims. Dependent claims define further advantageous specific examples of the present invention.

To solve the problems, according to a first aspect of the present invention, there is provided a system that has a plurality of information processing apparatuses and detects if events have occurred in the plurality of information processing apparatuses in a predetermined occurrence pattern, each of the plurality of information processing apparatuses comprising a storage device where at least one piece of pattern data indicating an occurrence pattern of events to be detected in that information processing apparatus is stored; a generation section that specifies a collection of events to be detected in the occurrence pattern based on the pattern data read from the storage device and generates necessary event data indicating the specified collection of events; a selection section that selects an event included in the necessary event data from events which have occurred in that information processing apparatus and events transferred from another information processing apparatus; and a detection section that detects if the selected event matches with the occurrence pattern indicated by the pattern data, and outputs a detection result. There are also provided an information processing apparatus provided in the system, a method for allowing the information processing apparatus to detect events, and a program that allows the information processing apparatus to detect events.

According to a second aspect of the present invention, there is provided a system that has a plurality of information processing apparatuses and allows the plurality of information processing apparatuses to transfer events to one another to detect if events have occurred in a predetermined occurrence pattern, each of the plurality of information processing apparatuses comprising a storage device where necessary event data indicating a collection of events included in any one of occurrence patterns of events to be detected in that information processing apparatus is stored; a request reception section that receives, from another information processing apparatus adjacent to that information processing apparatus, requested event data indicating a collection of events requested by the adjacent other information processing apparatus to transfer; a request transmission section that generates requested event data of that information processing apparatus by combining the received requested event data with the necessary event data read from the storage device, and sends the requested event data to still another information processing apparatus adjacent to that information processing apparatus; and a transfer section that transfers, to another information processing apparatus adjacent to that information processing apparatus, an event included in the requested event data received from the adjacent other information processing apparatus from events which have occurred in that information processing apparatus and events transferred from another information processing apparatus. There are also provided an information processing apparatus provided in the system, a method for allowing the information processing apparatus to transfer events, and a program that allows the information processing apparatus to transfer events.

BRIEF DESCRIPTION OF THE DRAWINGS

FIG. 3B is a diagram showing a specific example of the event body 300 according to the embodiment.

FIG. 4 is a diagram showing one example of the data structure of the event storage section 210 according to the embodiment.

FIG. 5 is a diagram showing one example of the data structure of the node information storage section 220 according to the embodiment.

BEST MODE FOR CARRYING OUT THE INVENTION

The present invention will be described below by way of the best mode of carrying out the invention (hereinafter called "embodiment"). However, an embodiment and modifications thereof described below do not limit the scope of the invention recited in the appended claims, or all the combinations of the features of the embodiment to be described should not necessarily be the means for solving the invention.

Figure 1:
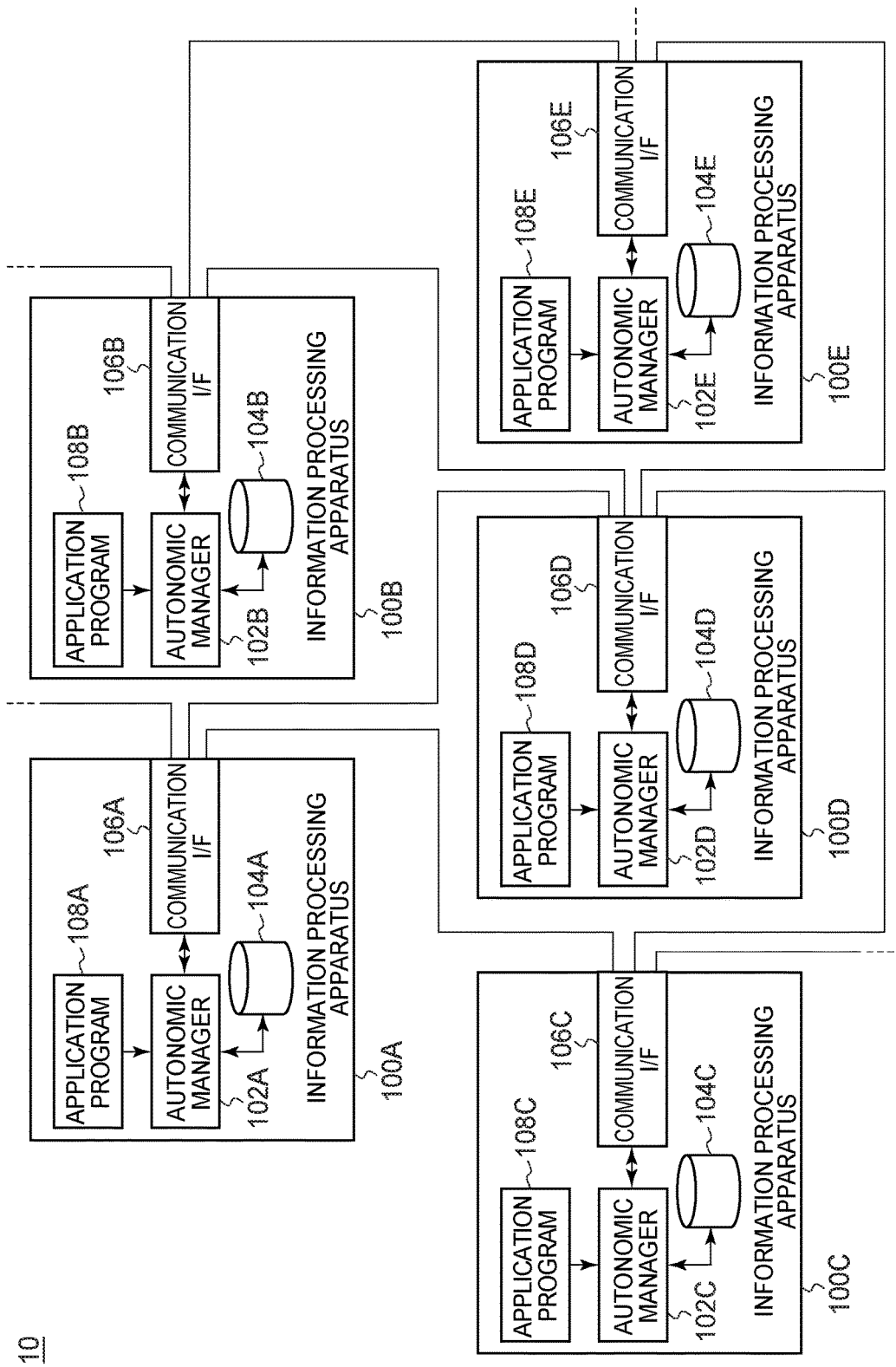
FIG. 1 is a diagram showing the general configuration of the information system 10 according to the embodiment.

FIG. 1 shows the general configuration of an information system 10 according to the embodiment. The information system 10 includes a plurality of information processing apparatuses, e.g., an information processing apparatus 100A, an information processing apparatus 100B, an information processing apparatus 100C, an information processing apparatus 100D, and an information processing apparatus 100E. Each of the information processing apparatuses 100A to 100E is a general-purpose apparatus, such as a personal computer, a server or a host computer. Instead, each of the information processing apparatuses 100A to 100E may be a special-purpose device, such as an input/output (I/O) device like a printer or a scanner, a network switch, or an NAS (Network Attached Storage). Further, each of the information processing apparatuses 100A to 100E may be a device provided in a portable or mobile unit, such as a cellular phone, a PDA, a car navigation system or an audio player. Furthermore, each of the information processing apparatuses 100A to 100E may be a home appliance, such as a video camera.

Each of the information processing apparatuses 100A to 100E has a storage device, a communication interface and a CPU (Central Processing Unit) as the basic hardware configuration. With processing by the CPU, each of the information processing apparatuses 100A to 100E runs at least one application program and an autonomic manager. The storage device and the communication interface provided in the information processing apparatus 100A are shown at 104A and 106A, respectively, the application program which runs on the information processing apparatus 100A is shown at 108A, and the autonomic manager provided in the information processing apparatus 100A is shown at 102A. The information processing apparatuses 100B to 100E have similar hardware and software components which are given with reference symbols respectively having suffixes "B" to "E" added to corresponding numerals of the components.

While the information processing apparatus 100A is directly connected to each of the information processing apparatuses 100C and 100D, the information processing apparatus 100A is not directly connected to the information processing apparatuses 100B and 100E. While the information processing apparatus 100B is directly connected to each of the information processing apparatuses 100D and 100E, the information processing apparatus 100B is not directly connected to the information processing apparatuses 100A and 100C. The information processing apparatus 100D is directly connected to each of the information processing apparatuses 100A, 100B, 100C and 100E. The connection may be achieved by wired or wireless connection, or a combination thereof. The term "connection" should not necessarily mean establishment of a physical communication path, and may, in practice, mean a logical communication path over a broadcast type network. The communication interfaces 106A to 106E provided in the information processing apparatuses 100A to 100E communicate with one another through those physical or logical communication paths. Because the information processing apparatuses are connected in a graphical fashion, each information processing apparatus may be referred to as "node" as if it were treated as a node in a graph.

Since the individual information processing apparatuses operate in approximately the same way, the information processing apparatus 100C will be described in detail below as a representative apparatus. The information processing apparatus 100C has an autonomic manager 102C, a storage device 104C, a communication interface 106C, and an application program 108C. The autonomic manager 102C detects if events have occurred in the information system 10 in a predetermined occurrence pattern. To achieve the detection, first, pattern data indicating an occurrence pattern to be detected is stored in the storage device 104C. The autonomic manager 102C acquires an event which has occurred in the application program 108C therefrom, or acquires an event which has occurred in another information processing apparatus via the communication interface 106C. Then, the autonomic manager 102C determines whether an occurrence pattern for the acquired events matches with the pattern data stored in the storage device 104C.

When there is a match, the autonomic manager 102C notifies a user of the occurrence of a predetermined symptom in the information system 10, or changes the setting in a predetermined manner. Each of the autonomic managers 102A, 102B, 102D and 102E, like the autonomic manager 102C, detects the occurrence of an event and attends to the event individually. It is to be noted that each of the storage devices 104A to 104E may store pattern data different from those of the other storage devices. Each of the storage devices 104A to 104E should desirably store only an occurrence pattern which is adequately detected in the information processing apparatus that has the storage device. Accordingly, occurrence patterns to be detected in the information processing apparatuses 100A to 100E can be made different from one another, so that the overall pattern detection process can be distributed to a plurality of apparatuses.

The information system 10 according to the embodiment is configured to detect and process patterns of events in a distributed way, so that events which have occurred at the respective locations in the information system 10 are adequately and efficiently transferred to the information processing apparatus that should detect the events.

Figure 2:
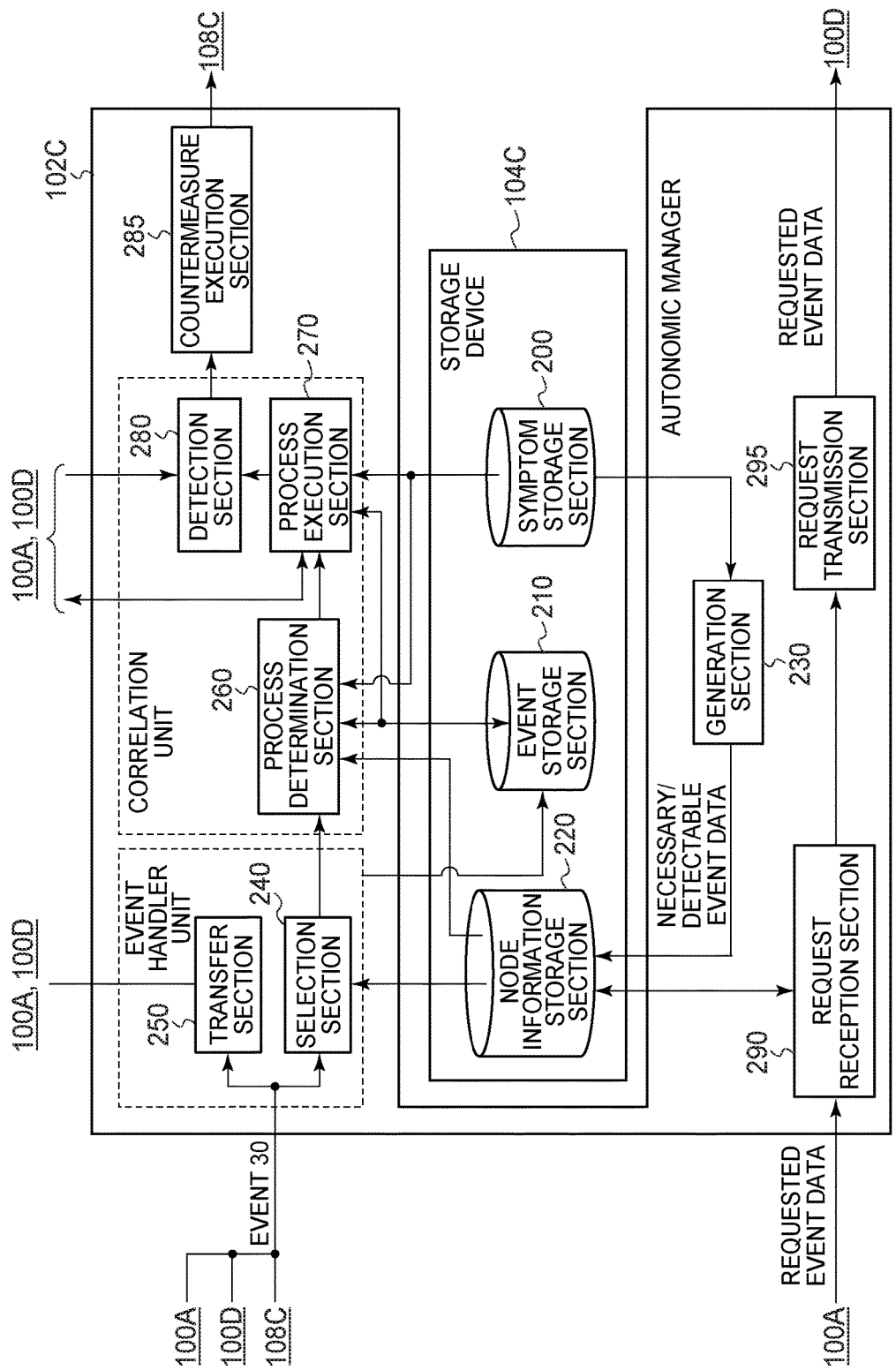
FIG. 2 is a diagram showing the functional structure of the autonomic manager 102C according to the embodiment in association with the data structure of the storage device 104C.

FIG. 2 shows the functional structure of the autonomic manager 102C according to the embodiment in association with the data structure of the storage device 104C. The autonomic manager 102C includes an event handler unit, a correlation unit, a countermeasure execution section 285, a generation section 230, a request reception section 290 and a request transmission section 295. The storage device 104C has a symptom storage section 200, an event storage section 210 and a node information storage section 220. The symptom storage section 200 stores at least one piece of pattern data indicating an occurrence pattern of events to be detected in the information processing apparatus 100C. Pattern data includes a plurality of tasks, for example. Each of the tasks determines whether each of a plurality of conditions to determine that events have occurred in the occurrence pattern is satisfied. In addition, the symptom storage section 200 stores a countermeasure process or the like which is to be executed when events have occurred in the occurrence pattern. A set of such pattern data and countermeasure process or the like is called symptom data, which will be specifically described later referring to FIGS. 6A and 6B.

The event storage section 210 is a storage area provided in the storage device 104C to store an event which has occurred in the application program 108C and an event acquired externally. The node information storage section 220 stores a collection of events needed for the detection by the information processing apparatus 100C itself, and events requested by another information processing apparatus to transfer which needs the events. Specific examples of the event storage section 210 and the node information storage section 220 will also be described later referring to FIGS. 4 and 5. The generation section 230 reads pattern data from the symptom storage section 200 and specifies a collection of events to be detected in an occurrence pattern indicated by the pattern data. (Note that an event to be detected in one occurrence pattern will also be called an event included in the occurrence pattern hereinafter.) Then, the generation section 230 generates necessary event data indicating the specified collection of events, and stores it in the node information storage section 220.

In addition, the generation section 230 may specify an occurrence pattern of events detectable in the information processing apparatus 100C based on the processing capability and process load of the information processing apparatus 100C. In this case, the generation section 230 generates detectable event data indicating a collection of events included in any one of the specified occurrence patterns, and stores the detectable event data in the node information storage section 220. In this case, further, the generation section 230 may update the generated detectable event data based on changes in the processing capability and process load of the information processing apparatus 100C. In accordance with the update of the detectable event data, the generation section 230 sends the updated detectable event data to another information processing apparatus 100 adjacent to the information processing apparatus 100C so that the adjacent information processing apparatus 100 updates necessary event data.

The event handler unit determines whether an event which has occurred in the information processing apparatus 100C (i.e., application program 108C) and an event transferred from another information processing apparatus are to be processed by the information processing apparatus 100C or to be transferred to another information processing apparatus to be processed therein. Specifically, the event handler unit has a selection section 240 and a transfer section 250. The selection section 240 acquires an event which has occurred in the information processing apparatus 100C (i.e., application program 108C) and an event transferred from another information processing apparatus. It is desirable that the selection section should acquire an event only from an information processing apparatus adjacent to the information processing apparatus 100C (i.e., connected directly to the information processing apparatus 100C without intervening any other information processing apparatus). In the embodiment, for example, the information processing apparatus 100C acquires an event from the information processing apparatus 100A or the information processing apparatus 100D. Data indicating the acquired event is event data 30.

The selection section 240 selects an event included in the necessary event data or detectable event data generated by the generation section 230 from occurred/acquired events. Then, the selection section 240 stores the selected event in the event storage section 210, and notifies a process determination section 260 of the selected event. Under a condition that a free space of the event storage section 210 is equal to or larger than a predetermined size, the selection section 240 may store even an event not included in necessary/detectable event data in the event storage section 210.

The transfer section 250 transfers an event which is included in neither the necessary event data nor the detectable event data to another information processing apparatus, e.g., the information processing apparatus 100A or the information processing apparatus 100D. Instead or in addition, the transfer section 250 may select and transfer an occurred event, if included in requested event data corresponding to another information processing apparatus, to the other information processing apparatus, regardless of whether the occurred event is included in the necessary event data or the like.

Based on the selected event, the correlation unit determines whether an occurrence pattern of events including the event matches with a predetermined pattern, and outputs a determination result. Specifically, the determination on pattern matching is made based on the degree of correlation when a pattern including a newly occurred event is compared with the history of occurrence of events, as well as on perfect matching. The determination technology is known as, for example, ACT (Active Correlation Technology). The correlation unit has an additional function of realizing the pattern detection process in cooperation with another information processing apparatus. Specifically, the correlation unit has the process determination section 260, a process execution section 270 and a detection section 280.

Upon reception of notification of the occurrence of an event from the selection section 40, the process determination section 260 searches the symptom storage section 200 for an occurrence pattern including the occurred event, and reads a plurality of tasks corresponding to the found occurrence pattern from the symptom storage section 200. Then, the process determination section 260 determines which information processing apparatus should process each of the tasks read. The determination may be made based on data that indicates, for each task, which information processing apparatus should process that task, or on a transfer record for events necessary for the processing of the task.

The process execution section 270 processes a task which is determined to be processed by the information processing apparatus 100C. The process execution section 270 also instructs another information processing apparatus to process a task which is determined to be processed by that information processing apparatus. The detection section 280 detects if the events notified by the selection section 240 match with an occurrence pattern indicated by the pattern data, and outputs a detection result. The detection process is realized by determining whether each condition determined by each task is fulfilled. Accordingly, the detection section 280 determines whether the detection is possible or not based on the result of the task executed by another information processing apparatus in addition to the result of the process executed by the process execution section 270. Under a condition that the events have occurred in the occurrence pattern, the countermeasure execution section 285 reads a countermeasure process stored in the symptom storage section 200 in association with the pattern data, and executes the countermeasure process. The countermeasure process is, for example, alteration of the setting in the application program 108C or the like.

The request reception section 290 and the request transmission section 295 serve to distribute necessary event data. Specifically, the distribution is carried out as follows. The request reception section 290 receives, from another information processing apparatus adjacent to the information processing apparatus 100C, requested event data indicating a collection of events requested by the adjacent other information processing apparatus to transfer. Then, the request transmission section 295 combines the received requested event data with necessary event data of the information processing apparatus 100C read from the node information storage section 220 and detectable event data to generate event data requested by the information processing apparatus 100C. The requested event data indicates a collection of events that the information processing apparatus 100C requests another information processing apparatus adjacent thereto to transfer. The request transmission section 295 sends the requested event data to the adjacent information processing apparatus. The sender of the original requested event data is excluded from a list of receivers. That is, when the information processing apparatus 100C receives the requested event data from the information processing apparatus 100A, for example, the information processing apparatus 100C transfers the requested event data to the information processing apparatus 100D.

Figure 3A:
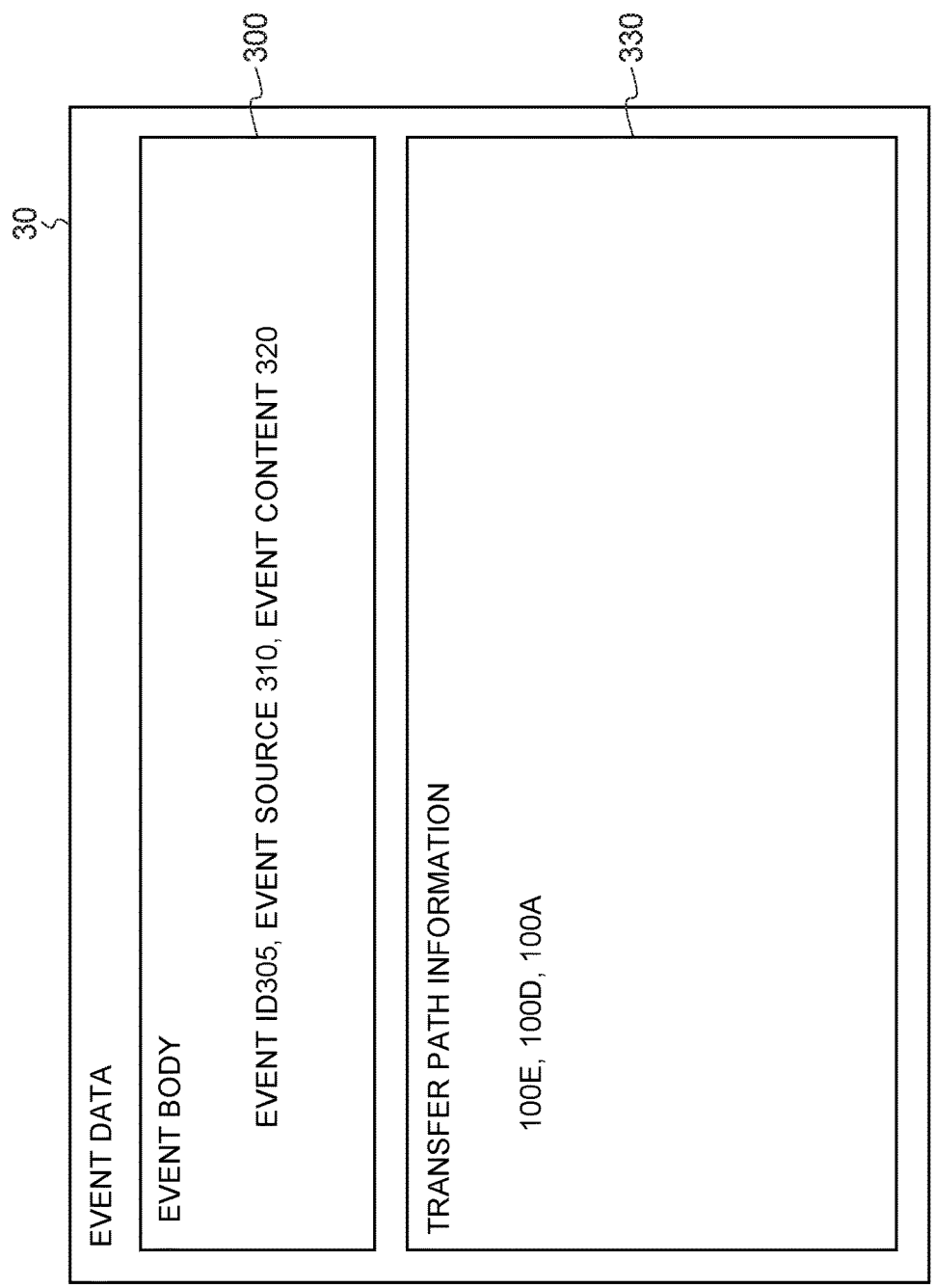
FIG. 3A is a diagram showing one example of the data structure of the event data 30 according to the embodiment.

FIG. 3A shows one example of the data structure of the event data 30 according to the embodiment. FIG. 3B shows a specific example of an event body 300 according to the embodiment. The event data 30 includes the event body 300 and transfer path information 330. The event body 300 is structured data which is described by the XML (eXtensible Markup Language) or the like, and, as an example, conforms to the event format of WSDM (Web Services Distributed Management). The transfer path information 330 includes identification information of an information processing apparatus that is a source of the event and identification information of information processing apparatuses in a transfer path. In transferring an event, the selection section 240 can exclude any apparatus which has received the event from a list of event transfer destinations by referring to the information of the transfer path.

The event body 300 includes at least an event ID 305, an event source 310 and an event content 320. As shown on line 3 in FIG. 3B, the event ID 305 is recorded in association with a tag indicating identification information of the event. As shown on lines 4 to 9 in FIG. 3B, the event source 310 includes the URL (Uniform Resource Locator) of an apparatus of the event source and the name of the apparatus. As shown on lines 10 to 21 in FIG. 3B, the event content 320 includes the detailed content of the event and a status at the time the event has occurred. In the example of FIG. 3B, it is recorded on line 17 that the printer has run out of paper. As apparent from the above, an event is information output from a hardware or software component to indicate its operational status. As is usual in this technical field, the term "event" not only indicates an operational status itself but also means data describing the operational status in the embodiment.

FIG. 4 shows one example of the data structure of the event storage section 210 according to the embodiment. The event storage section 210 stores, for each event, event identification information, data on the event, identification information of an information processing apparatus of a sender when the event has been transferred from another apparatus, a flag indicating whether the event has been deleted or not, and identification information of an information processing apparatus at a transfer destination (receiver) to which the event has been transferred. For example, an event 1234 (indicating an event with identification information "1234"; the same is applied to other events hereinafter) has occurred in the information processing apparatus 100E at 6:00 with the content indicating that the priority of the event 1234 is 0. As the event 1234 has been transferred from the information processing apparatus 100D, the transfer section 250 stores the identification information of the information processing apparatus 100D in association with the event 1234. As the transfer section 250 has neither deleted nor transferred the event 1234, the event storage section 210 has neither the deletion flag nor the receiver identification information stored for the event.

For an event deleted from the event storage section 210, the transfer section 250 stores the identification information of the event in association with the information processing apparatus to which the event has been transferred. Specifically, the event storage section 210 deletes the content of an event 2345, sets the deletion flag and stores the identification information of the receiver's information processing apparatus. Even in this case, the transfer section 250 may keep storing least necessary information to identify the category of the event, such as the event source or the time of occurrence of the event. As another example, the transfer section 250 may transfer an event regardless of whether the event has been deleted. In this case, the deletion flag is kept reset and the identification information of the receiver is stored in the event storage section 210 as is the case for an event 3456.

FIG. 5 shows one example of the data structure of the node information storage section 220 according to the embodiment. For each of other information processing apparatuses adjacent to the information processing apparatus 100C, the node information storage section 220 stores requested event data indicating a collection of events whose transfer is requested by the adjacent information processing apparatus. Specifically, requested event data of the information processing apparatus 100A is 1234, 2345, etc., and requested event data of the information processing apparatus 100D is 5678, 6789, etc. Referring to this data structure, the transfer section 250 can transfer an event to a proper apparatus. For example, the transfer section 250 can transfer the event 1234 to the information processing apparatus 100A when the information processing apparatus 100C acquires the event 1234, and can transfer the event 5678 to the information processing apparatus 100D when the information processing apparatus 100C acquires the event 5678.

Requested event data of another information processing apparatus adjacent to the information processing apparatus 100C indicates a collection of events included in necessary event data or detectable event data of that adjacent other information processing apparatus, or included in requested event data of still another information processing apparatus adjacent to that adjacent other information processing apparatus. For example, the requested event data of the information processing apparatus 100D includes necessary event data of the information processing apparatus 100B and information processing apparatus 100E as well as necessary event data of the information processing apparatus 100D. Such structure of requested event data can allow an event to adequately reach an information processing apparatus which needs the event through an adequate path passing adjacent information processing apparatuses in order. The technique of transferring requested event data to the individual apparatuses will be described later referring to FIGS. 9A and 9B and FIG. 10.

The node information storage section 220 further stores necessary event data and detectable event data of the information processing apparatus 100C itself. Because necessary event data is a collection of events needed to detect an occurrence pattern in the information processing apparatus 100C as mentioned above, it is also called interest data to mean a collection of events in which the information processing apparatus 100C is interested. In spite of the meaning, necessary event data may be determined arbitrarily according to the policy of an administrator of the information processing apparatus 100. Because detectable event data is a collection of events detectable from the viewpoint of the processing capability or the like of the information processing apparatus 100C as mentioned above, it is also called capability data. As various kinds of data are stored in the node information storage section 220, the selection section 240 can adequately determine an event to be stored in the event storage section 210 by referring to the node information storage section 220.

Figure 6A:
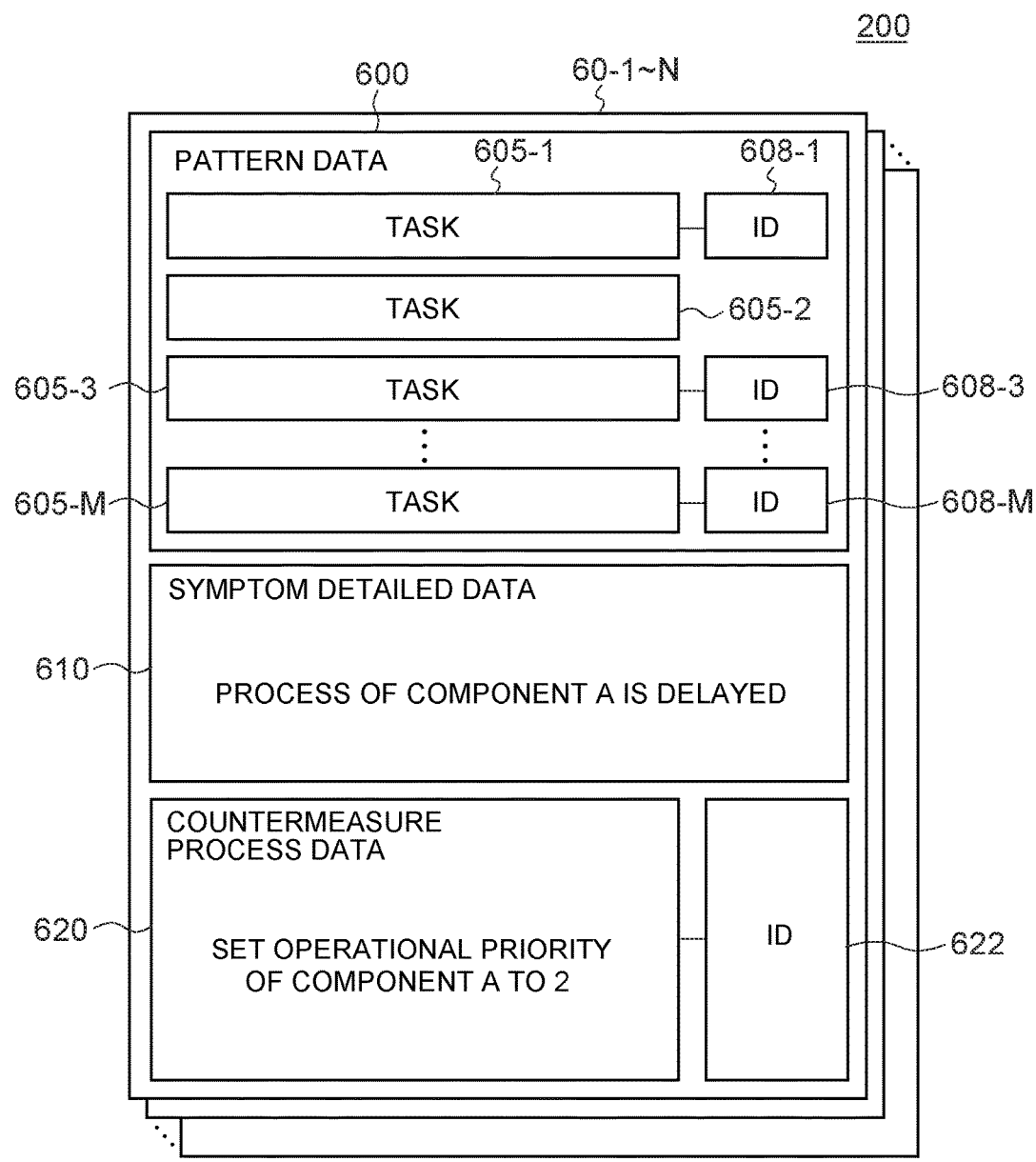
FIG. 6A is a diagram showing one example of the data structure of the symptom storage section 200 according to the embodiment.

FIG. 6A shows one example of the data structure of the symptom storage section 200 according to the embodiment. The symptom storage section 200 stores symptom data for each occurrence pattern of events to be detected. Specifically, the symptom storage section 200 stores symptom data 60-1 to 60-N. A combination of symptom data stored differs from one information processing apparatus 100 to another. The information processing apparatus 100 may store symptom data 60 in advance at the time it is shipped as a product or when the autonomic manager 102 is installed, but may acquire symptom data 60 dynamically as follows. For example, when one information processing apparatus 100 (e.g., information processing apparatus 100C) is newly connected to the information system 10, the information processing apparatus 100C requests another information processing apparatus 100 (e.g., information processing apparatus 100D) already included in the information system 10 to transfer symptom data 60. At the time of transmission, the request may be associated with attribute information, such as the location where the information processing apparatus 100C is provided and assignment of the information processing apparatus 100C. Based on the attribute information, the information processing apparatus 100D sends symptom data 60, selected from pieces of symptom data 60 stored in the symptom storage section 200 of the information processing apparatus 100D, to the information processing apparatus 100C.

Next, symptom data 60-1 as a representative of those pieces of symptom data 60-1 to 60-N will be described. The symptom data 60-1 includes pattern data 600, symptom detailed data 610 and countermeasure process data 620. The pattern data 600 indicates an occurrence pattern of events to be detected in the information processing apparatus 100C. Specifically, the pattern data 600 includes a plurality of tasks (e.g., tasks 605-1 to 605-M) respectively associated with identification information (e.g., identification information 608-1 to 608-M) of information processing apparatuses which are allowed to process the tasks.

As one example, the task 605-1 is a task to determine a condition, and is associated with identification information 608-1 of the information processing apparatus that is allowed to execute the process. There may be a task like the task 605-2, which is not associated with identification information of the information processing apparatus that is allowed to execute the process. The symptom detailed data 610 indicates a symptom which appears in the information system 10 when the condition determined by each task is fulfilled. The symptom detailed data 610 may be output when the condition is fulfilled or may be referable even if it is not used in any process when the system administrator maintains or checks the symptom data 60-1.

The countermeasure process data 620 indicates a process which is executed when an event occurs in the occurrence pattern. In this example, the details of a specific setting work, e.g., "set the operational priority of component A to 2", are recorded. The countermeasure process data 620 may indicate a process which calls a user's attention like "display information on an occurred event" besides such a specific setting work. Although the content of a setting process is described by a natural language for the sake of descriptive convenience in the embodiment, the content may, in practice, include a specific command (e.g., a method to be invoked) to make such setting and a parameter thereof. Further, the symptom storage section 200 may store identification information 622 indicating identification information of the information processing apparatus that is allowed to execute the process, in association with the countermeasure process data 620. This can allow the information processing apparatus which has finished executing all tasks to determine where to execute a later countermeasure process.

Figure 6B:
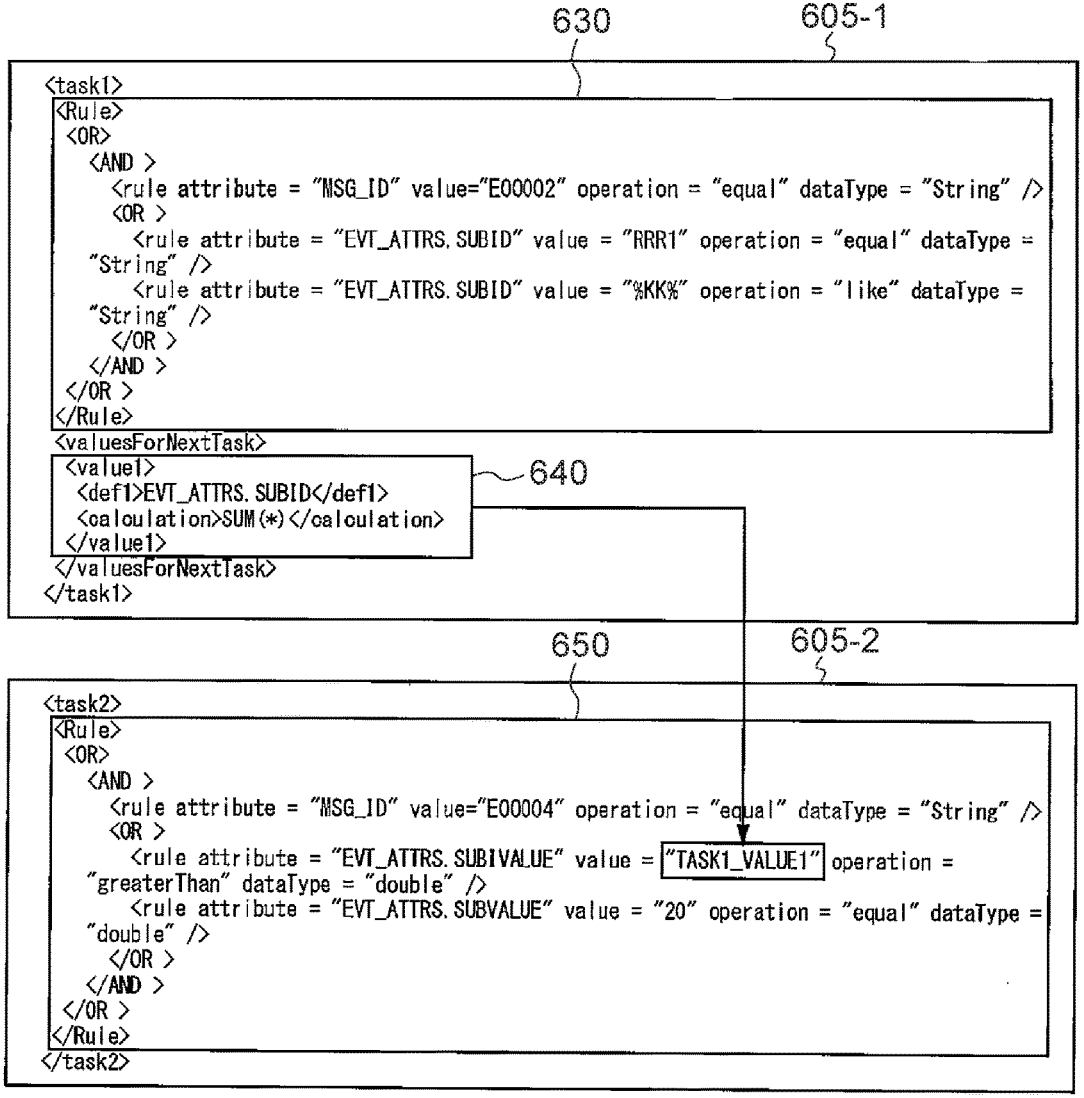
FIG. 6B is a diagram showing specific examples of the tasks 605-1 and 605-2.

FIG. 6B shows specific examples of the tasks 605-1 and 605-2. Those tasks may be structured data written by a language like XML. The task 605-1 includes a partial expression 630 and an output definition 640. The partial expression 630 indicates the entity of a determination process. For example, for each of a plurality of events, the partial expression 630 indicates that it is determined whether the ID and attribute of an occurred event take predetermined values, and an evaluation value is computed by a logical AND or logical OR operation on logical values indicative of the determination result. The output definition 640 indicates a method of computing a value to be output to another task besides the evaluation value.

The task 605-2 includes a partial expression 650. The partial expression 650, like the partial expression 630, determines the ID and attribute of each of a plurality of events, and evaluates a logical expression based on the determination result. The partial expression 650 indicates that an output value computed in the output definition 640 should be referred to in the determination process.

Conditions that each task determines are not limited to those based on the ID and attribute of each event. For example, each task may determine based on the number of times of occurrence of one event, the order of occurrence of a plurality of events, whether a combination of events has occurred in a predetermined period, whether one event has not occurred, or a combination thereof.

Figure 7A:
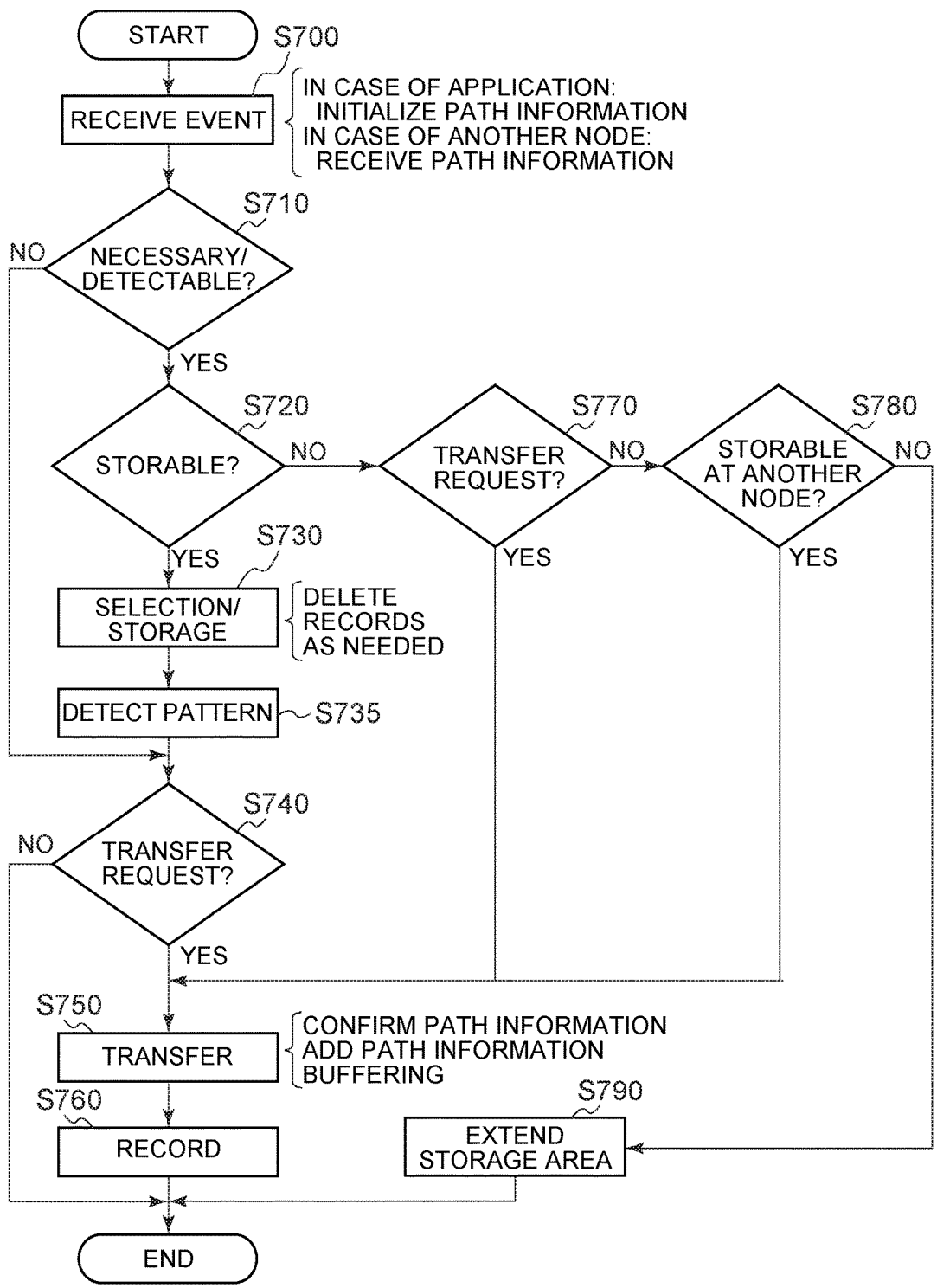
FIG. 7A is a diagram illustrating a flowchart of a process which is executed by the autonomic manager 102C according to the embodiment in response to the occurrence of an event.
Figure 7B:
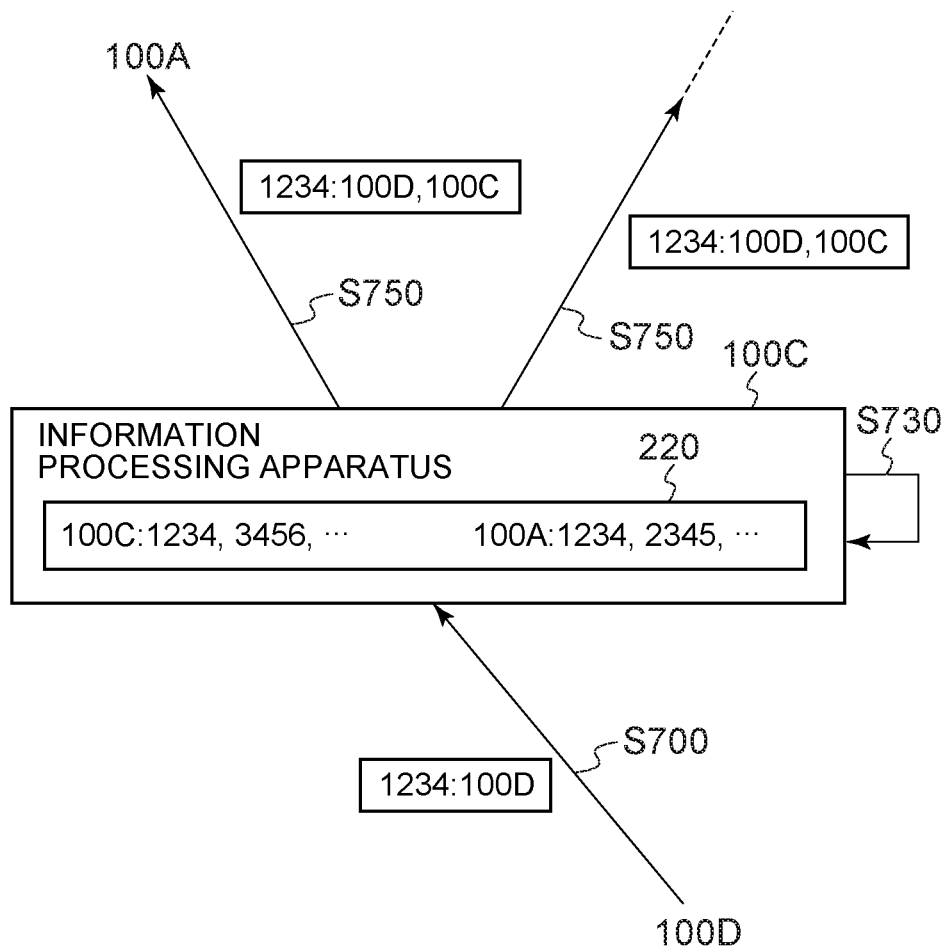
FIG. 7B is a diagram one example of data to be transmitted/received in the process which is executed by the autonomic manager 102C in response to the occurrence of an event.

FIG. 7A illustrates a flowchart of a process which is executed by the autonomic manager 102C according to the embodiment in response to the occurrence of an event. FIG. 7B shows one example of data to be transmitted/received in the process which is executed by the autonomic manager 102C in response to the occurrence of an event. The selection section 240 and the transfer section 250 receive an event which has occurred in the information system 10 (S700). When receiving the event from the application program 108C, the transfer section 250 generates information indicating a transfer path for the event in association therewith. The identification information of the information processing apparatus 100C where the event has occurred is recorded in the generated information as an initial value. When receiving the event transferred from another information processing apparatus like the information processing apparatus 100A or the information processing apparatus 100D, the transfer section 250 further receives information indicating a transfer path for the event in association therewith. As shown in FIG. 7B, for example, the transfer section receives the identification information of the information processing apparatus 100D located in the transfer path for the event 1234 in association therewith.

Next, the selection section 240 determines whether the received event is included in the necessary event data or detectable event data of the information processing apparatus 100C (S710). Under a condition that the event is included in such event data, the selection section determines whether the event can be stored, e.g., whether there is a sufficient space available in the storage device 104C to store the event (S720). When the event is storable (S720: YES), the selection section 240 selects the event as a target for event pattern detection and stores the event in the event storage section 210 (S730). As an example, because the received event 1234 is included in the necessary event data of the information processing apparatus 100C as shown in FIG. 7B, the event 1234 is stored in the event storage section 210. When a free space of the event storage 120 becomes small due to the storing of the event, the selection section 240 may delete other events stored in the event storage section 210.

Then, the detection section 280 reads pattern data from the symptom storage section 200 and detects if the occurred event matches with the pattern data based on the events stored in the event storage section 210 (S735). For example, the detection section 280 itself may execute the detection process in cooperation with the process determination section 260 and the process execution section 270, or, with the function of the process execution section 270, may cause another information processing apparatus to execute at least a part of the detection process. There are a case where the apparatus that executes the detection process has been determined statically and a case where this apparatus is determined dynamically. In the case of the static determination, the task 605 is associated with the identification information 608 in the symptom data 60. In this case, the detection section 280 instructs the information processing apparatus identified by the identification information 608 to execute the task 605.

In the case of the dynamic determination, the task 605 is not associated with the identification information 608. In this case, first, the process execution section 270 attempts to execute the task 605 by itself. However, there may be a case where an event to be used in the determination process of the task is not stored in the event storage section 210, disabling the process execution section 270 to execute the task. In this case, the process execution section 270 determines whether identification information of the event is stored in the event storage section 210 and identification information of the receiving information processing apparatus to which the event has been transferred is stored in association with the identification information of the event. When such identification information is stored, the process execution section 270 instructs the detection section of the receiving information processing apparatus to execute the process of detecting the occurrence pattern.

In this case, the process execution section 270 may send the detection process instruction associated with symptom data on the occurrence pattern to be detected to the receiving information processing apparatus. This allows the information processing apparatus having received the detection process instruction to adequately detect even an occurrence pattern whose detection by the information processing apparatus is not predetermined. The result of the detection process which is executed this way may be output to the user. The countermeasure execution section 285 may further execute a countermeasure process based on the detection result.

After the detection process (S735) or when no event is storable in the event storage section 210 (S720: NO), the transfer section 250 determines whether the received event is included in requested event data corresponding to another information processing apparatus adjacent to the information processing apparatus 100C (S740, S770). When the received event is included in the requested event data (S740: YES, S770: YES), the transfer section 250 selects such an event and transfers the event to the adjacent other information processing apparatus (S750). It is to be noted that this process is carried out under a condition that identification information of the information processing apparatus to which the event is to be transferred is not included in the transfer path information received in association with the event. As shown in FIG. 7B, for example, because the identification information of the information processing apparatus 100D is included in the received transfer path information, the transfer section 250 does not transfer the event to the information processing apparatus 100D in adjacent information processing apparatuses, and transfers the event only to the information processing apparatus 100A and another adjacent information processing apparatus.

In this case, the transfer section 250 adds the identification information of the information processing apparatus 100C to the transfer path information, and sends the resultant information in association with the event to be transferred. For example, the path information associated with the event includes the identification information of the information processing apparatus 100C in addition to the identification information of the information processing apparatus 100D. When the information processing apparatus 100C is temporarily uncommunicatable with the transfer destination, the transfer section 250 may sequentially buffer events to be transferred and send those events together when the information processing apparatus 100C becomes communicatable. The transfer section 250 may send buffered events only in a predetermined period, such as a maintenance time for the information system 10, so as not to interfere with the process of the application program 108C or the like.

In addition, the transfer section 250 may send only an event whose priority previously associated with each event is equal to or greater than a reference value, thereby reducing the communication traffic and process load. The terms "transfer", "transmission" and the like indicate transfer/transmission of an event as a consequence, and does not restrictively indicate a specific process of the information processing apparatus 100C to send data from another information processing apparatus. When the information processing apparatus 100C has server software components in a server-client model installed therein and the information processing apparatus at the transfer destination has client software components installed therein, for example, the information processing apparatus 100C may carry out the transfer process by instructing the information processing apparatus at the transfer destination to acquire an event. When the transfer is completed, the transfer section stores the identification information of the transferred event in the event storage section 210 in association with the identification information of the information processing apparatus at the transfer destination for the event (S760).

When the received event is not storable in the information processing apparatus 100C (S720: NO) and is not included in requested event data corresponding to any adjacent information processing apparatus (S770: NO), the transfer section 250 determines whether the received event is storable in any one of the adjacent information processing apparatuses (S780). The determination may be achieved as the transfer section 250 inquires each adjacent information processing apparatus about a free space of the storage area. For example, the determination may be achieved by acquiring detectable event data of the adjacent information processing apparatuses. This is because detectable event data indicates that the corresponding event can be detected, and thus indicates that, if possible, at least an associated event can be stored.

When the received event is storable in any one of the adjacent information processing apparatuses (S780: YES), the transfer section 250 proceeds to the process of step S750 of transferring the event to that information processing apparatus. When the received event is not storable in any adjacent information processing apparatus (S780: NO), the transfer section 250 executes a process of expanding the storage area of the event storage section 210 in the storage device 104C so as to be able to store the event and events to occur later (S790).

Figure 8:
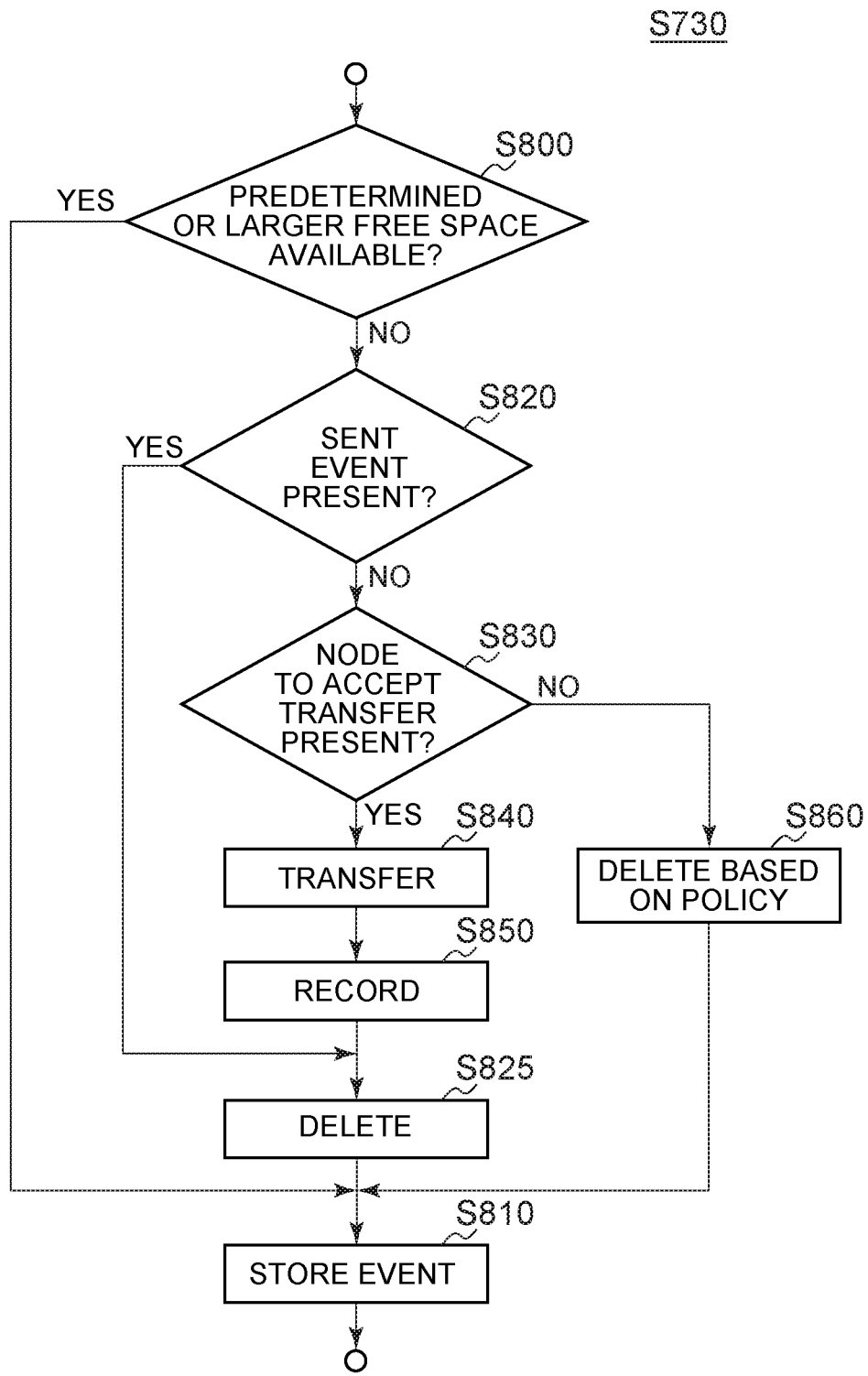
FIG. 8 is a diagram showing the details of the process of S730.

FIG. 8 shows the details of the process of S730. The selection section 240 determines whether a free space of the event storage section 210 is equal to or larger than a predetermined size (S800). Under a condition that the free space of the event storage section 210 is equal to or larger than the predetermined size (S800: YES), the selection section 240 stores the event in the event storage section 210 (S810). Under a condition that the free space of the event storage section 210 becomes less than the predetermined size (S800: NO), the transfer section 250 searches the event storage section 210 for any event which has already been sent to another information processing apparatus but has not been deleted yet (S820).

When such an event is found (S820: YES), the transfer section 250 deletes the event from the event storage section 210 (S825). When the deleted event is the one transferred from another information processing apparatus (e.g., information processing apparatus 100D) and stored in the event storage section 210, the transfer section 250 notifies the information processing apparatus 100D of the deletion of the event. Determination of whether that another information processing apparatus is the information processing apparatus 100D may be achieved by referring to the identification information of the sending information processing apparatus associated with the event in the event storage section 210. In the notified information processing apparatus 100D, the transfer section 250 deletes the identification information of the event associated with the receiving information processing apparatus 100C from the storage device of the information processing apparatus 100D. Then, the transfer section 250 of the information processing apparatus 100C stores the new event received in the event storage section 210 (S810). When the event is the one transferred from another information processing apparatus, the transfer section 250 stores the identification information of that another information processing apparatus, as information indicating the information processing apparatus that has sent the event, in the event storage section 210 in association with the event.

When no such event is found (S820: NO), the transfer section 250 determines whether there is any adjacent information processing apparatus which accepts transfer of any event stored in the event storage section 210 (S830). This determination may be achieved by inquiring another information processing apparatus adjacent to the information processing apparatus 100C about information, such as detectable event data, as done in the foregoing example. When there is an information processing apparatus which accepts event transfer (S830: YES), the transfer section 250 transfers the event read from the event storage section 210 to the information processing apparatus (S840). The event to be transferred is, first of all, an event not included in the necessary event data or detectable event data of the information processing apparatus 100C. When there is no such event or when there are a plurality of such events, an event may be selected based on the priority of the event, the time of occurrence thereof or the like. Then, the transfer section 250 stores a flag indicating that the event is to be deleted and the identification information of the information processing apparatus at the transfer destination in the event storage section 210 in association with the identification information of the event (S850), and proceeds to the process of S825 to delete the event.

When there is no information processing apparatus which accepts event transfer (S830: NO), the transfer section 250 deletes some event already stored in the event storage section 210 according to a predetermined policy (S860), and stores the received event in the event storage section 210 (S810).

According to the embodiment described above referring to FIGS. 1 to 8, an event which has occurred at some location in the information system 10 can adequately be sent to an information processing apparatus which needs that event. Accordingly, each information processing apparatus can independently detect an event occurrence pattern and determine whether a predetermined symptom has occurred.

Because each information processing apparatus stores a collection of events needed by another information processing apparatus adjacent thereto, events are transferred in an adequate path through a plurality of information processing apparatuses. This can eliminate the need for an additional process, such as search for a path in transferring an event, thus making the overall processes of the information system 10 efficient.

Next, referring to FIGS. 9A and 9B and FIG. 10, a description will be given of a method of allowing each information processing apparatus to acquire requested event data of another information processing apparatus adjacent thereto to realize such efficient event transfer.

Figure 9A:
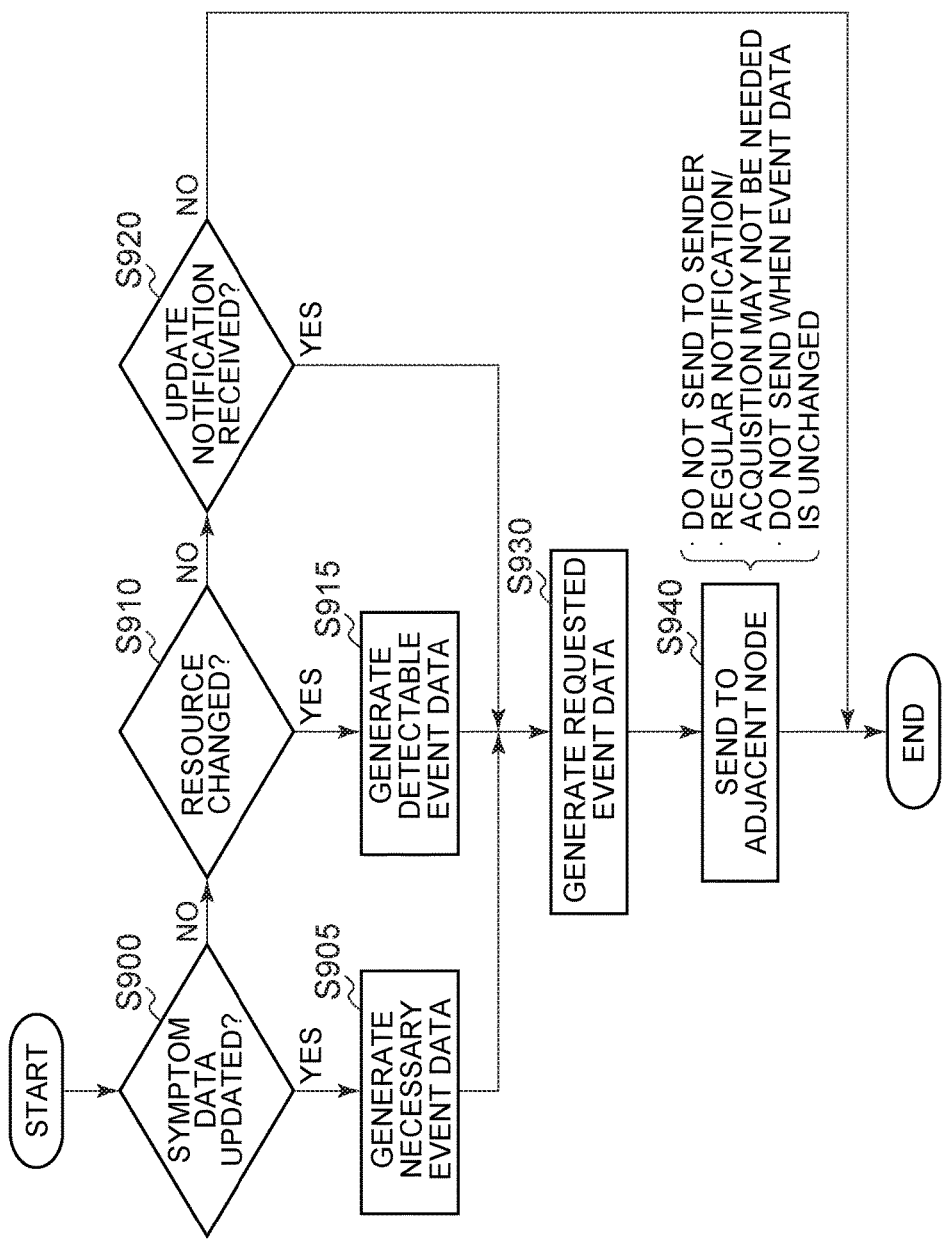
FIG. 9A is a diagram illustrating a flowchart of a process which is executed by the autonomic manager 102C according to the embodiment in response to the update of symptom data.
Figure 9B:
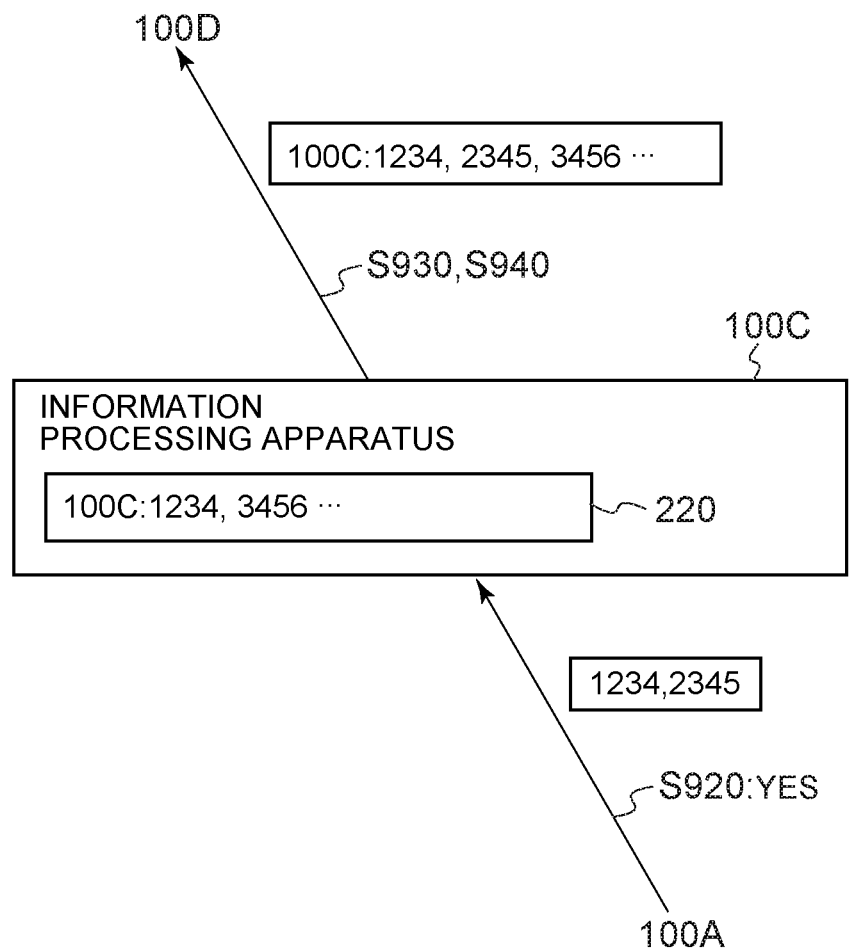
FIG. 9B is a diagram showing one example of data to be transmitted/received in the process which is executed by the autonomic manager 102C in response to the update of symptom data.
Figure 10:
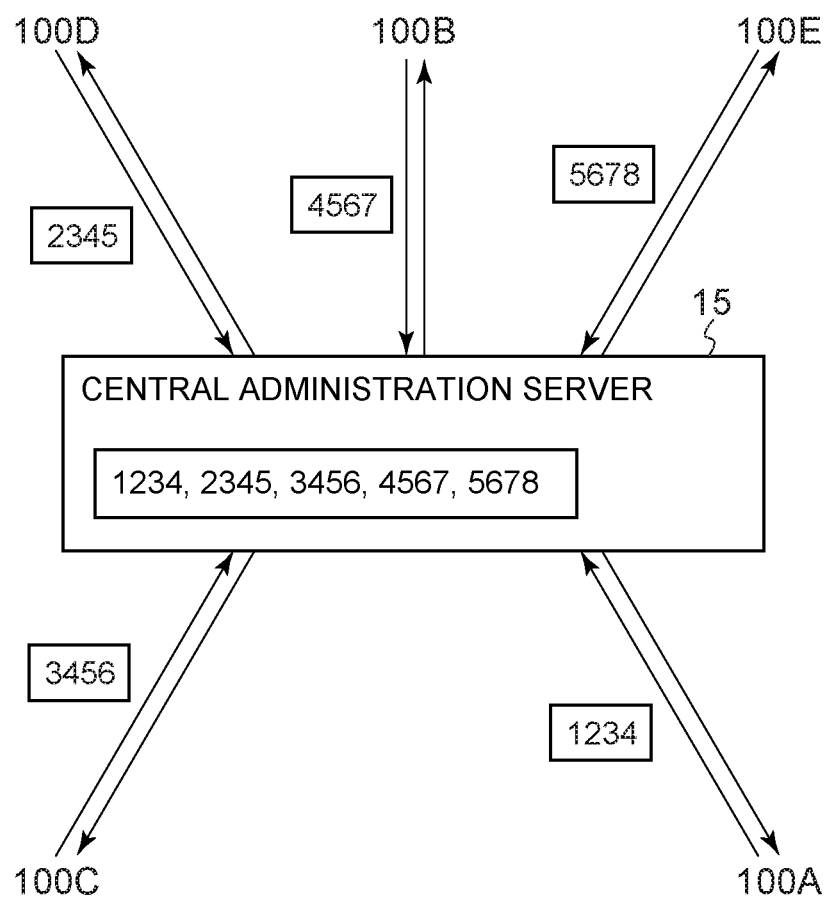
FIG. 10 is a conceptual diagram of processes in which the individual information processing apparatuses share requested event data in the modified embodiment.

FIG. 9A illustrates a flowchart of a process which is executed by the autonomic manager 102C according to the embodiment in response to the update of symptom data. FIG. 9B shows one example of data to be transmitted/received in the process which is executed by the autonomic manager 102C in response to the update of symptom data. Every time pattern data 600 stored in the symptom storage section 200 is updated (S900: YES), the generation section 230 generates necessary event data based on the updated pattern data 600 (S905).

Every time the processing capability and process load of the information processing apparatus 100C are changed (S910: YES), the generation section 230 generates detectable event data based on the changed processing capability and process load (S915). The processing capability is determined based on software components as well as hardware components of the information processing apparatus 100C. For example, the processing capability indicates an event detecting function provided in the autonomic manager 102C besides the computing power of the CPU and the storage capacity of the storage device. For example, a sub component provided beforehand for each detection function, called an event detecting engine, can be added to the autonomic manager 102C. The generation section 230 may update detectable event data according to the addition of such a sub component.

The request reception section 290 determines whether a notification to update requested event data indicative of a collection of events requested by another information processing apparatus adjacent to the information processing apparatus 100C to transfer has been received therefrom (S920). This notification may be updated requested event data itself or may be a difference between collections of events before and after the update. Under a condition that the notification has been received (S920: YES), the request transmission section 295 combines requested event data indicated by the received notification with necessary event data and detectable event data generated by the generation section 230 to generate requested event data of the information processing apparatus 100C (S930).

Specifically, the request transmission section 295 computes a union of the requested event data of the adjacent information processing apparatus, the necessary event data of the information processing apparatus 100C and the detectable event data of the information processing apparatus 100C, as updated requested event data. Upon reception of the collection of the events 1234 and 2345 as requested event data in the example of FIG. 9B, for example, the request reception section 290 computes a union of that collection and the collection of the events 1234 and 3456 which is a collection of necessary and detectable event data. The union to be computed includes the events 1234, 2345 and 3456.

Then, the request transmission section 295 sends the generated requested event data to an adjacent information processing apparatus to update requested event data stored in the adjacent information processing apparatus (S940). Note that the sending information processing apparatus that has sent the update notification received in S920 is excluded from transfer destinations. The request transmission section 295 may sequentially buffer requested event data to be transmitted, and transmit the requested event data with predetermined timing, e.g., regularly. The request transmission section 295 may achieve the transmission of requested event data by sending an instruction to acquire the requested event data to another information processing apparatus like the above-described example of the event transfer. When the requested event data generated in S930 is identical to the requested event data before generation, the requested event data may not be transmitted.

As described above referring to FIGS. 9A and 9B, each information processing apparatus notifies an adjacent information processing apparatus of update of necessary event data according to the execution of the update, and the notified information processing apparatus combines the notification with an event needed by itself and notifies still another adjacent information processing apparatus of the combined event data. This makes it possible to gradually transfer necessary event data, updated by one information processing apparatus, to other information processing apparatuses over a network. It is therefore possible to prevent concentration of the communication traffic and process load at a specific location in the network by effecting gradual data transfer with the cooperation of the individual information processing apparatuses.

When a server with an extremely high processing capability is provided in the network, however, the server may carry out centralized management of requested event data. One example of the case is shown as a modified embodiment in FIG. 10. FIG. 10 is a conceptual diagram of processes in which the individual information processing apparatuses share requested event data in the modified embodiment. A central administration server 15 gathers necessary event data and detectable event data from each of the information processing apparatuses 100A to 100E. For example, the central administration server 15 receives an event 1234 from the information processing apparatus 100A, an event 4567 from the information processing apparatus 100B, an event 3456 from the information processing apparatus 100C, an event 2345 from the information processing apparatus 100D, and an event 5678 from the information processing apparatus 100E. The central administration server 15 computes a logical sum of the received events and sends the logical sum as requested event data to each of the information processing apparatuses 100A to 100E. In this modified embodiment, each information processing apparatus 100 can also determine which node in the information system 10 needs which event.

Figure 11:
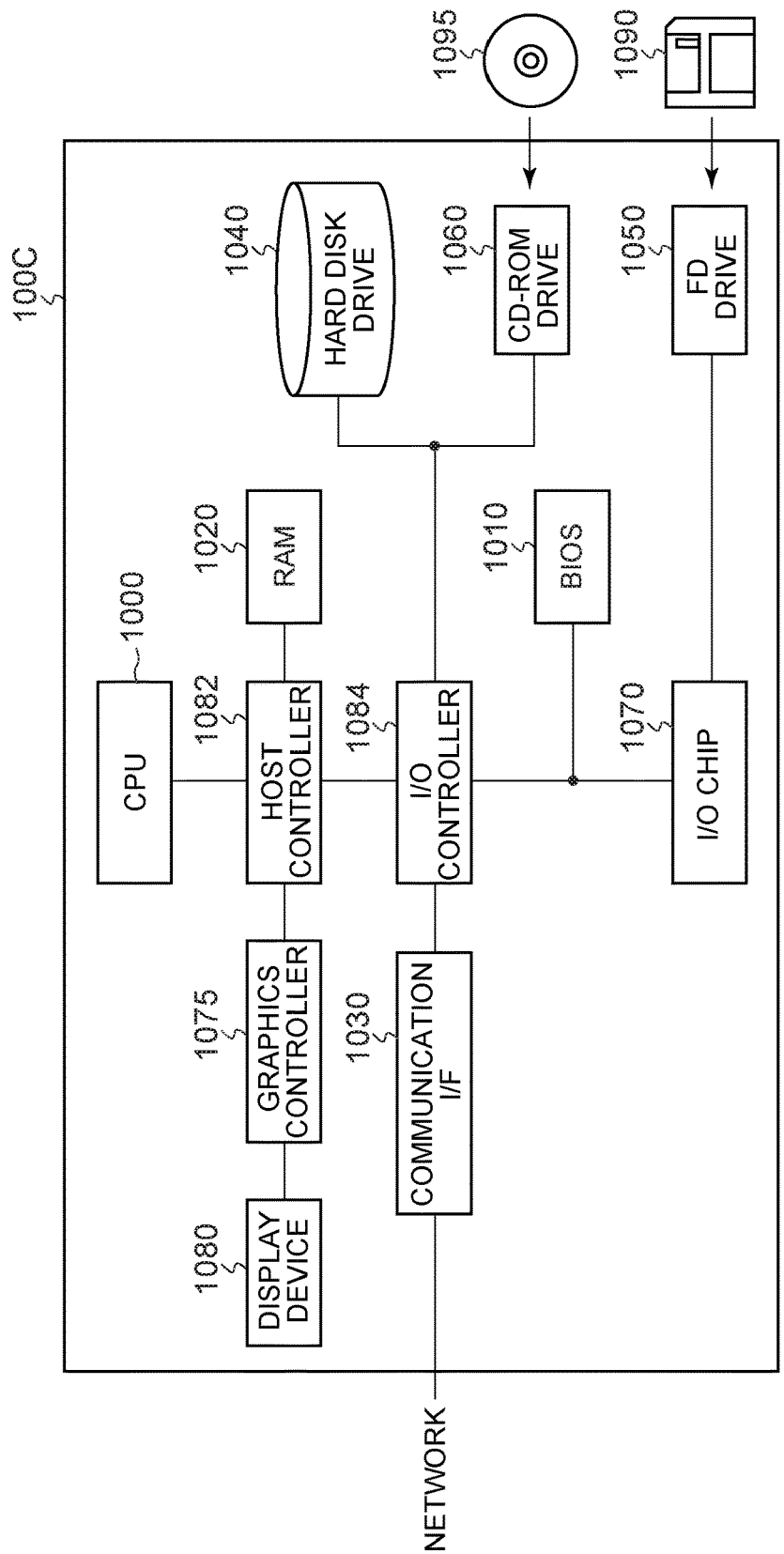
FIG. 11 is a diagram showing one example of the hardware configuration of the information processing apparatus 100C.

FIG. 11 shows one example of the hardware configuration of the information processing apparatus 100C which serves as the terminal device 20 or the management device 30. The information processing apparatus 100C includes a CPU-related section, an input/output section, and a legacy input/output section. The CPU-related section has a CPU 1000, a RAM 1020 and a graphics controller 1075, which are mutually connected by a host controller 1082. The input/output section has a communication interface 1030 (corresponding to the communication interface 106C in FIG. 1), a hard disk drive 1040 (corresponding to the storage device 104C in FIG. 1) and a CD-ROM drive 1060, which are connected to the host controller 1082 by an input/output controller 1084. The legacy input/output section has a ROM 1010, a flexible disk drive 1050 and an input/output chip 1070, which are connected to the input/output controller 1084.

The host controller 1082 connects the RAM 1020 to the CPU 1000 and the graphics controller 1075, which access the RAM 1020 at a high transfer rate. The CPU 1000 operates to control the individual sections based on programs stored in the ROM 1010 and the RAM 1020. The graphics controller 1075 acquires image data which is generated by the CPU 1000 or the like on a frame buffer provided in the RAM 1020. Instead, the graphics controller 1075 may include a frame buffer inside to store image data generated by the CPU 1000 or the like.

The input/output controller 1084 connects the host controller 1082 to the communication interface 1030, the hard disk drive 1040 and the CD-ROM drive 1060, which are relatively fast input/output devices. The communication interface 1030 communicates with an external device over a network. The hard disk drive 1040 stores programs and data which the information processing apparatus 100C uses. The CD-ROM drive 1060 reads programs and data from a CD-ROM 1095, and provides the RAM 1020 or the hard disk drive 1040 with the programs and data.

The input/output controller 1084 is connected with relatively slow input/output devices, such as the flexible disk drive 1050 and the input/output chip 1070. The ROM 1010 stores a boot program which is executed by the CPU 1000 when the information processing apparatus 100C is activated, and programs which depend on the hardware of the information processing apparatus 100C. The flexible disk drive 1050 reads programs and data from a flexible disk 1090, and provides the RAM 1020 or the hard disk drive 1040 with the programs and data via the input/output chip 1070. The input/output chip 1070 connects flexible disk 1090 and various kinds of input/output devices via, for example, a parallel port, a serial port, a keyboard port, a mouse port and so forth.

The program to be provided to the information processing apparatus 100C is stored in a recording medium, such as the flexible disk 1090, the CD-ROM 1095 or an IC card, and provided by a user. The program is read from the recording medium via the input/output chip 1070 and/or the input/output controller 1084, and is installed and executed on the information processing apparatus 100C. Because the operations which the program allow the information processing apparatus 100C or the like to execute are the same as the operations of the information processing apparatus 100C which have been explained referring to FIGS. 1 to 10, their descriptions will be omitted.

The program described above may be stored in an external storage medium. An optical recording medium, such as DVD or PD, a magnetooptical recording medium, such as MD, a tape medium, a semiconductor memory, such as an IC card, and the like can be used as storage media in addition to the flexible disk 1090 and the CD-ROM 1095. A storage device, such as a hard disk or RAM, provided at a server system connected to a private communication network or the Internet can be used as a recording medium to provide the information processing apparatus 100C with the program over the network. Because the hardware configuration of each of the information processing apparatus 100A, the information processing apparatus 100B, the information processing apparatus 100D and the information processing apparatus 100E is substantially identical to the information processing apparatus 100C, its description will be omitted.

Although the embodiment of the present invention has been described above, the technical scope of the invention is not limited to the scope of the above-described embodiment. It should be apparent to those skilled in the art that various changes and improvements can be made to the embodiment. It is apparent from the description of the appended claims that such changed or improved embodiments are encompassed in the technical scope of the invention.

What is claimed is:

1. A first networked peer-to-peer device comprising:
   a processor configured to independently or as a group of processors, perform a method comprising,
   identifying a new pattern data event at the first networked peer-to-peer device or a second networked peer-to-peer device in a network of the first networked peer-to-peer device;
   reading previous pattern data events from a peer-to-peer device in the network, the previous pattern data events stored at a storage device;
   and
   determining if the new pattern data event at a peer-to-peer device in the network corresponds with a pattern data event that has previously occurred in one or more peer-to-peer devices of the network, and is stored at the storage device,
   wherein the storage device stores a plurality of patterned data events previously occurring at one or more peer-to-peer devices of the peer-to-peer devices of the network and,
   wherein identifying comprises identifying a new pattern data event at one or more peer-to-peer devices of the peer-to-peer devices of the network.

2. The first networked peer-to-peer device of claim 1 wherein the plurality of patterned data events stored at the storage device include an event body and transfer path information, the event body comprising one or more of an event ID, an event source, or event content, and the transfer path information identifying one or more of the identification of the source of the event or transfer path information.

3. The first networked peer-to-peer device of claim 1 wherein the storage device stores, for each event of the plurality of patterned data events, comprises: an event identification; an event time; an event source; a sender identification; and a receiver identification.

4. The first networked peer-to-peer device of claim 1 where the processor or group of processors comprise program instructions that cause the one or more processors to also:
   determine whether pattern data event at a networked peer-to-peer device and new pattern data event received at the first networked peer-to-peer device are to be processed at the first networked peer-to-peer device or transferred to another peer-to-peer device of the network for processing.

5. The first networked peer-to-peer device of claim 1 where the processor or group of processors include program instructions that cause the one or more processors to also:
   store a collection of pattern data events for use by another peer-to-peer device, the another peer-to-peer device accessible to the network.

6. The first networked peer-to-peer device of claim 1 where the processor or group of processors include program instructions that cause the one or more processors to also:
   update stored previous pattern data events from a peer-to-peer device, the data events stored at the storage device.

7. A computer process for identifying patterns of events in a peer-to-peer network, the process comprising:
   identifying, at a microprocessor, a new pattern data event at a first peer-to-peer device of a group of peer-to-peer devices or a second a peer-to-peer device in the group of peer-to-peer devices;
   reading, previous pattern data events from the group of peer-to-peer devices, the previous pattern data events stored at a non-volatile storage, wherein the storage contains one or more pattern data events from the first peer-to-peer device of the group of peer-to-peer devices, the one or more pattern data events identified by a microprocessor in the second peer-to-peer device or a third peer-to-peer device of the group of peer-to-peer devices;
   determining, by the microprocessor, if the new pattern data event at the first or second peer-to-peer device corresponds with a pattern data event that has previously occurred in one or more peer-to-peer devices of the group of peer-to-peer devices, and is stored at the non-volatile storage; and
   after determining whether to process a received new pattern date event at a receiving peer-to-peer device, transferring the received new pattern data event received at the peer-to-peer device to a different peer-to-peer device of the same network, and different than the sender of the new pattern data event, for processing by the second peer-to-peer device.

8. The computer process of claim 7 wherein the non-volatile storage stores a plurality of patterned data events previously occurring at one or more peer-to-peer device from the group of peer-to-peer devices.

9. The computer process of claim 8 wherein the plurality of patterned data events stored at the non-volatile storage include an event body and transfer path information, the event body comprising an event ID, an event source, and event content, and the transfer path information identifying the identification of the source of the event and transfer path information.

10. The computer process of claim 7 wherein the non-volatile storage stores, for each event, of the plurality of patterned data events comprises: an event identification; an event time; and event source; a sender identification; and a receiver identification.

11. The computer process of claim 7 further comprising:
   storing a collection of pattern data events for use by a peer-to-peer device accessible to the same network as the microprocessor.

12. The computer process of claim 7 further comprising:
   updating previous pattern data events from a plurality of peer-to-peer devices stored at the non-volatile storage.

13. The computer process of claim 7 further comprising:
   selecting, by the microprocessor, an event included in pattern event data from events that have occurred in the peer-to-peer device in which the microprocessor resides; and
   determining, by the microprocessor, whether to transfer the event to another peer-to-peer device for processing.

14. The computer process of claim 7 wherein the previous pattern data events stored at the non-volatile storage comprise at least one piece of pattern data indicating an occurrence pattern of events to be detected in the peer-to-peer device in which the microprocessor resides.

15. The computer process of claim 7 further comprising:
   detecting and processing, by the microprocessor, patterns of events in a distributed manner wherein a pattern data event that has occurred at a peer-to-peer device is transferred to a second peer-to-peer device for that second peer-to-peer device to detect events in that transferred pattern data event.

16. A correlation unit comprising:
   a microprocessor;
   computer memory storing instructions for the microprocessor, the instructions, when run, causing the microprocessor to perform a process comprising:
   identifying a new pattern data event at a first peer-to-peer device in a group of peer-to-peer devices;
   considering previous pattern data events from the group of peer-to-peer devices, the previous pattern data events stored at a non-volatile storage, wherein the nonvolatile storage contains one or more previous pattern data events from the group of peer-to-peer devices, the one or more previous pattern data events received by the second peer-to-peer device or a third peer-to-peer device of the group of peer-to-peer devices; and
   determining if the new pattern data event at the first peer-to-peer device corresponds with a previous pattern data event that has been received in one or more peer-to-peer devices of the group, and is stored at the non-volatile storage,
   wherein the determination, if the new pattern data event corresponds with a previous pattern data event, includes a degree of correlation analysis between the new pattern data event and the previous pattern data event stored at the non-volatile storage.

17. The correlation unit of claim 16 further comprising:
   a process determination section;
   a process execution section; and
   a detection section,
   wherein the process determination section is configured to communicate with the process execution section, and the process execution section is configured to communicate with the detection section.

18. The correlation unit of claim 16 is further configured such that when a new pattern data event is not stored in the nonvolatile storage and identification information of the new pattern data event is stored in the nonvolatile storage, the microprocessor instructs a peer-to-peer device of the group to execute a process of detecting the new pattern data event indicated by the stored identification information of the new pattern data event.

19. The correlation unit of claim 16 wherein the microprocessor is at the first peer-to-peer device.

* * * * *